(12) United States Patent
Pfister et al.

(10) Patent No.: US 8,302,395 B2
(45) Date of Patent: Nov. 6, 2012

(54) HYDRAULIC SYSTEM

(75) Inventors: Jochen Pfister, Strasbourg (FR); Reinhard Stehr, Bühl (DE); Roshan Willeke, Karlsruhe (DE); Eric Müller, Kaiserslautern (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 949 days.

(21) Appl. No.: 12/317,241

(22) Filed: Dec. 19, 2008

(65) Prior Publication Data
US 2009/0229262 A1    Sep. 17, 2009

Related U.S. Application Data

(60) Provisional application No. 61/008,391, filed on Dec. 19, 2007.

(51) Int. Cl.
*F16D 31/02* (2006.01)

(52) U.S. Cl. .......................................................... 60/430
(58) Field of Classification Search .................... 60/429, 60/430
See application file for complete search history.

(56) References Cited

U.S. PATENT DOCUMENTS

| | | | |
|---|---|---|---|
| 3,968,811 A * | 7/1976 | Fillion | 60/430 |
| 4,712,375 A * | 12/1987 | Kauss et al. | 60/422 |
| 2005/0235637 A1* | 10/2005 | Muller et al. | 60/420 |

* cited by examiner

*Primary Examiner* — F. Daniel Lopez
(74) *Attorney, Agent, or Firm* — Alfred J. Mangels

(57) ABSTRACT

A hydraulic system for actuating a belt-driven conical-pulley transmission having a variably adjustable transmission ratio, of a vehicle, including at least one hydraulic energy source and having a torque sensor that is supplied with working medium by a pump flow of the hydraulic energy source. A disconnection valve is connected between the hydraulic energy source and the torque sensor, which makes it possible to connect or disconnect an additional pump flow of the hydraulic energy source, depending on need.

8 Claims, 2 Drawing Sheets

HYDRAULIC SYSTEM

BACKGROUND OF THE INVENTION

The invention relates to a hydraulic system for actuating a belt-driven conical-pulley transmission of a vehicle, the transmission having a variably adjustable transmission ratio and including a torque sensor, the hydraulic system having at least one hydraulic energy source for supplying the torque sensor with working medium by a pump flow of the hydraulic energy source.

An object of the invention is to provide a hydraulic system in which losses that occur in operating the hydraulic energy source can be reduced.

SUMMARY OF THE INVENTION

The problem is solved in a hydraulic system for actuating a belt-driven conical-pulley transmission of a vehicle, the transmission having a variably adjustable transmission ratio and including a torque sensor, the hydraulic system having at least one hydraulic energy source for supplying the torque sensor with working medium by a pump flow of the hydraulic energy source, by connecting a disconnection valve between the hydraulic energy source and the torque sensor that makes it possible to connect or disconnect an additional pump flow of the hydraulic energy source, if necessary. The first-named pump flow is also referred to as the first pump flow. The other pump flow is also referred to as the second pump flow. Independent of this identification of the pump flows, however, the hydraulic energy source can include more than two pump flows. The pump flows can be realized through a single pump or through a plurality of pumps. Preferably, the pump flows are provided by a single pump. If the second pump flow is connected to the first pump flow, then both pump flows are conveyed together to the torque sensor. If the second pump flow is disconnected, then the second pump flow is conveyed into a working medium tank, so that only the first pump flow is conveyed to the torque sensor. The invention furnishes a sensible connection layout of a double-flow pump. That makes it possible to uncouple a pump flow from the system pressure in certain operating states. On the other hand, the two pump flows provide for an adequate transport volume in critical situations. Among other things, that provides the advantage that unnecessary losses in the transmission can be reduced.

A preferred exemplary embodiment of the hydraulic system is characterized in that a check valve is connected between the two pump flows in such a way that the first pump flow is separated from the second pump flow as soon as the second pump flow is disconnected. That prevents the first pump flow from being partially conveyed into the tank when the second pump flow is disconnected.

Another preferred exemplary embodiment of the hydraulic system is characterized in that the disconnection valve is connected via a control pressure line to a return line that comes from the torque sensor. The disconnection valve is actuated by way of the control pressure line, depending on the pressure in the return line. Preferably, a clutch cooling valve is connected into the return line between the torque sensor and the control pressure line, with which excess working medium passes from the clutch cooling valve to a clutch cooling device, for example by way of a jet pump.

Another preferred exemplary embodiment of the hydraulic system is characterized in that a pressure conversion valve is connected into the control pressure line. The pressure conversion valve enables the actuating force at the disconnection valve to be increased significantly.

Another preferred exemplary embodiment of the hydraulic system is characterized in that the disconnection valve is executed as a 2/2 directional valve with an open position and a closed position, into which the 2/2 directional valve is biased. When the disconnection valve is in the open position, the second pump flow is conveyed into the tank; that is, it is disconnected. When the disconnection valve is in the closed position, the second pump flow is connected to the first pump flow. Both pump flows are then conveyed together to the torque sensor. The bias is realized, for example, with the aid of a biasing spring.

Another preferred exemplary embodiment of the hydraulic system is characterized in that the disconnection valve is connected via another control pressure line to a connection valve, which is connected ahead of the torque sensor. The connection valve, which is preferably connected between the pressure regulating valve and the torque sensor, works together with the bias of the disconnection valve, in order to quickly switch the disconnection valve to its closed position when necessary.

Another preferred exemplary embodiment of the hydraulic system is characterized in that the connection valve is executed as a 3/2 directional valve with an open position and a closed position, into which the 3/2 directional valve is biased. When the connection valve is in the open position, the other control pressure line is pressurized with the pressure ahead of the torque sensor. When the connection valve is in the closed position, the other control pressure line is relieved into the tank.

Another preferred exemplary embodiment of the hydraulic system is characterized in that the connection valve is actuated with the pressure ahead of the torque sensor. If the pressure ahead of the torque sensor rises above a specified value, the connection valve is opened and the disconnection valve is closed, in order to connect the second pump flow again.

Another preferred exemplary embodiment of the hydraulic system is characterized in that the disconnection valve is pressurizable via the other control pressure line and the connection valve with the pressure ahead of the torque sensor. That enables the second pump flow to be connected quickly when necessary.

Another preferred exemplary embodiment of the hydraulic system is characterized in that a pressure regulating valve is connected between the hydraulic energy source and the torque sensor. The pressure regulating valve, which is also referred to as a pressure holding valve, provides for a desired system pressure to be maintained ahead of the torque sensor.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
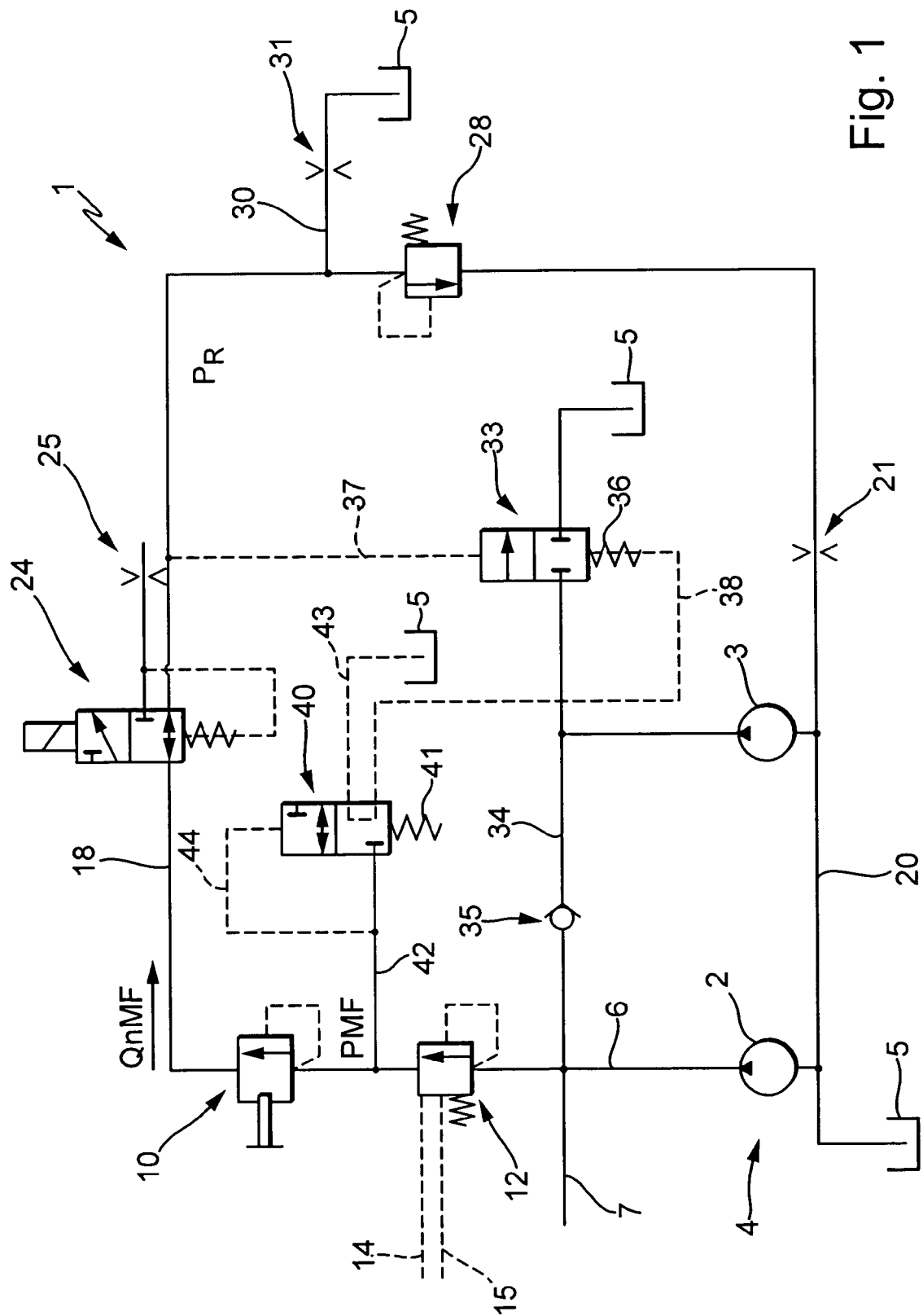
FIG. 1: a detail of a hydraulic circuit diagram of a hydraulic system according to the invention, according to a first exemplary embodiment, having a disconnection valve and a connection valve.
Figure 2:
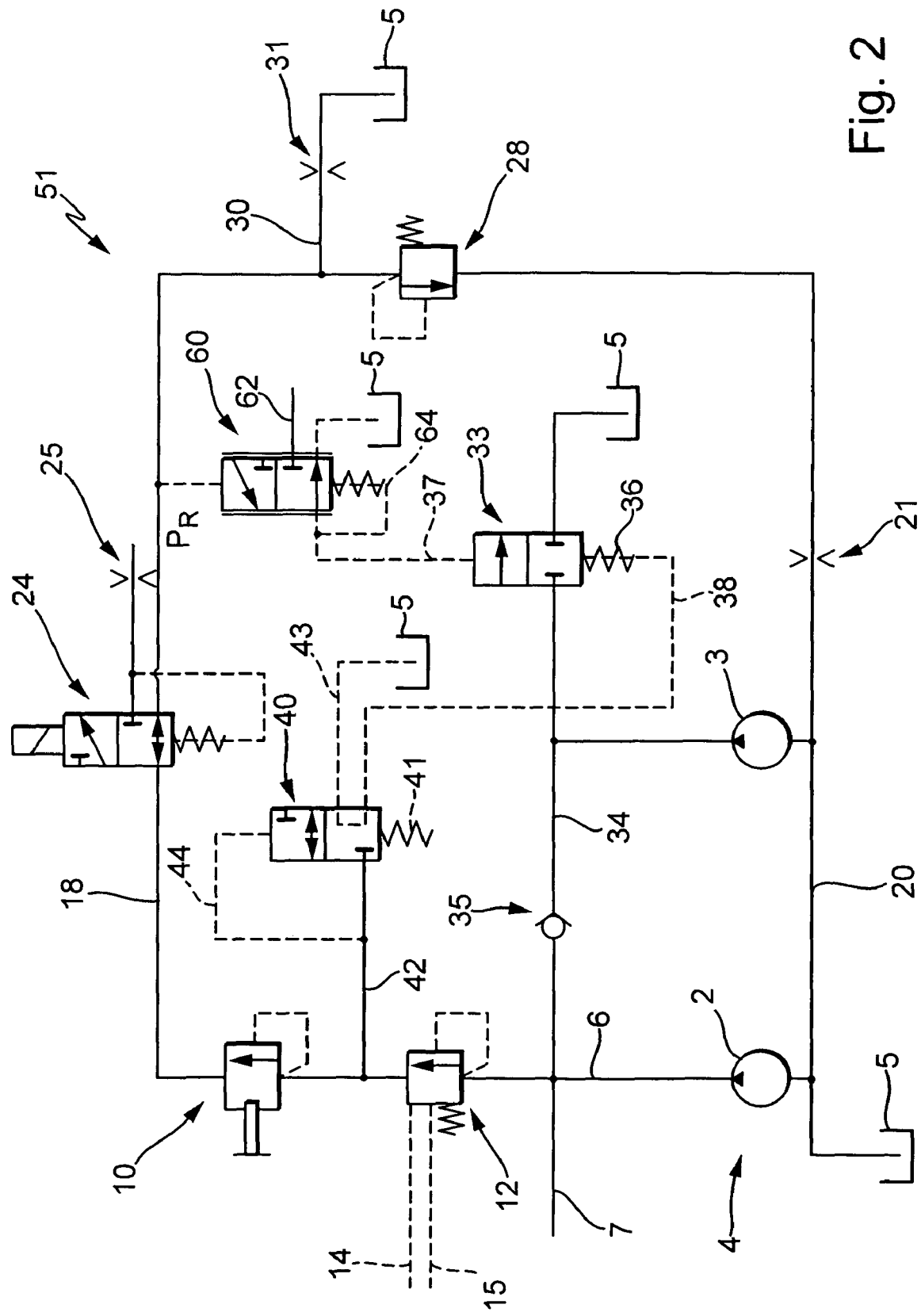
FIG. 2: a detail of a hydraulic circuit diagram similar to that in FIG. 1 according to a second exemplary embodiment, having an additional pressure conversion valve.

FIGS. 1 and 2 depict hydraulic systems 1 and 51, respectively, with the aid of symbols conventionally used in hydraulics for a hydraulic circuit diagram. In the hydraulic circuit diagram, a tank with hydraulic medium is designated at each of various places by a symbol with the reference label 5. The hydraulic medium contained in the tank is preferably hydraulic oil, also referred to as oil. Hydraulic system 1, 51 serves to control a belt-driven conical-pulley transmission, which is situated in the power train of a motor vehicle. Such belt-driven conical-pulley transmissions are also referred to as CVT transmissions (CVT, continuously variable transmission). This is a stepless vehicle transmission, which makes great driving comfort possible through jerk-free changing of the transmission ratio.

The two hydraulic systems 1, 51 are so similar that the same reference labels are used to designate like parts. In contrast to a conventional hydraulic system, hydraulic systems 1, 51 include two pump flows 2, 3, which are provided by a hydraulic energy source 4. Hydraulic energy source 4 is preferably a hydraulic pump which conveys the two pump flows 2, 3 out of tank 5 into a connecting line 6. From connecting line 6 comes another connecting line 7, through which hydraulic system 1, 51 is connected to other consumers, which are not shown for the sake of clarity. The other consumers are for example disk sets of the belt-driven conical-pulley transmission, clutches, cooling devices, etc., which act in combination through a plurality of valves.

The two pump flows 2, 3 are connected via connecting line 6 to a torque sensor 10, which ensures that when the transmission is in operation there is constantly sufficient clamping pressure applied to transmit torque between the pulleys and a corresponding encircling element of the belt-driven conical-pulley transmission, in particular depending on the torque applied to the belt-driven conical-pulley transmission. The pressure ahead of torque sensor 10 is identified as $p_{MF}$. The flow rate of hydraulic medium through or after torque sensor 10 is identified as $Q_{nMF}$. Connected ahead of torque sensor 10 is a pilot valve 12, which is also referred to as a pressure regulating valve, and which serves to keep the pressure $p_{MF}$ ahead of torque sensor 10 to a minimum pressure level of 6 to 6.5 bar, for example. Pressure regulating valve 12 is actuatable through pressure return lines 14, 15.

Torque sensor 10 is connected through a return line 18 to an input line 20, which in turn is connected to the inputs of pump flows 2, 3. Connected to input line 20 ahead of pump flows 2, 3 is a jet pump 21, which serves to improve the suction performance. Situated in return line 18 and connected after torque sensor 10 is a clutch cooling valve 24, which serves to convey surplus hydraulic medium from return line 18 through a jet pump 25 to a clutch cooling device (not shown). Return line 18 is therefore also referred to as the cooler return line.

Clutch cooling valve 24 is connected ahead of a pressure holding valve 28, which serves to maintain a desired minimum pressure in return line 18. Hydraulic medium is discharged from return line 18 into tank 5 through a discharge line 30. An auxiliary restrictor 31 is situated in discharge line 30. In reality there are numerous restrictors situated in return line 18 between the output of torque sensor 10 and pressure holding valve 28, for example for pulley cooling, for oiling, and so on. These restrictors (not shown) are combined in auxiliary restrictor 31 for the sake of simplification.

Disconnection of second pump flow 3 is only possible if torque sensor 10 is supplied with adequate flow volume. Assuming the critical conditions in regard to temperature and opening size for a certain flow volume $Q_{nMF}$ through torque sensor 10, a maximum possible pressure $p_{MF}$ exists ahead of torque sensor 10. Second pump flow 3 can only be disconnected if first pump flow 2 is conveying sufficient volume to build up the necessary pressure $p_{MF}$ ahead of torque sensor 10.

In conjunction with the present invention, a threshold value for $Q_{nMF}$ of about 3 liters per minute has proven to be especially advantageous. Starting at a flow volume $Q_{nMF}$ of about 3 liters per minute, according to an aspect of the present invention second pump flow 3 should be disconnected, so that for large portions of driving operation one pump flow conveys or is conveyed into the tank, and thus unwanted losses are minimized. It has also been found in conjunction with the present invention that with this flow volume a pressure $p_{MF}$ of only about 30 bar can be built up ahead of torque sensor 10. According to another aspect of the invention, this pressure affects the circuit according to the invention.

The area between the output of torque sensor 10 and pressure holding valve 28 has proven to be especially well suited for obtaining information about the flow volume $Q_{nMF}$ via torque sensor 10. If the pressure $p_{MF}$ ahead of torque sensor 10 is less than 1.8 bar, then pressure holding valve 28 is closed, and only the flow volume $Q_{nMF}$ which is flowing through torque sensor 10 determines the pressure in this area. This pressure can be determined with the aid of a restrictor formula. A flow volume of 2 liters per minute results in a pressure $p_R$ of about 0.5 bar in return line 18 after torque sensor 10 or after clutch cooling valve 24. When this pressure is reached, then according to an essential aspect of the invention a disconnection valve 33 is supposed to switch second pump flow 3 in the direction of tank 5.

Disconnection valve 33 is connected to the outputs of the two pump flows 2, 3 of hydraulic energy source 4 through a disconnection line 34. A check valve 35 is connected into disconnection line 34 between the outputs of the two pump flows 2, 3. Disconnection valve 33 is designed as a 2/2 directional valve that has a closed position in which a connection between disconnection line 34 and tank 5 is interrupted. Disconnection valve 33 is biased by a spring 36 into its closed position depicted in FIGS. 1 and 2. In an open position (not shown), disconnection valve 33 connects disconnection line 34 to tank 5.

Disconnection valve 33 is actuated by way of a control pressure line 37, through which disconnection valve 33 is pressurized with the pressure $p_R$ behind torque sensor 10 or behind clutch cooling valve 24. The control pressure provided via control pressure line 37 counteracts the biasing force of spring 36. Above a certain pressure in return line 18, which acts on disconnection valve 33 through control pressure line 37, disconnection valve 33 or a corresponding valve piston in disconnection valve 33 moves from the depicted closed position into the open position; that is, disconnection valve 33 begins to open. That causes part of the flow volume of second pump flow 3 to be conveyed in the direction of the tank 5.

The remaining portion of the flow volume of second pump flow 3, on the other hand, continues to be conveyed through disconnection line 34 to torque sensor 10. At disconnection valve 33 an equilibrium develops between the force from the pressure $p_R$ in return line 18 or control pressure line 37 and the biasing force of spring 36. If the volumetric flow rises further, then at some time the flow volume of first pump flow 2 is sufficient to supply the additional consumers via connecting line 7, and in addition to also transport the desired 3 liters per minute through torque sensor 10 that are necessary to switch disconnection valve 33. At that moment second pump flow 3 is transported entirely in the direction of tank 5, and check valve 35 closes. The pressure against which second pump flow 3 must work when transporting then collapses suddenly, and the losses of hydraulic energy source 4 are greatly reduced.

In most cases a flow volume of 3 liters per minute is sufficient for torque sensor 10 to function. However, at higher torques and consequently higher $p_{MF}$ levels the volume flow requirement is greater. That need can be met by adding second pump flow 3 back in above a certain pressure level of $p_{MF}$. According to another aspect of the invention, such connection of second pump flow 3 is achieved by means of a connection valve 40.

It has been found in connection with the present invention that for the design of the circuit according to the invention the switching point of pressure holding valve 28 is relevant at around 5.9 liters per minute. From that point on the pressure $p_R$ no longer has any restriction behavior but remains nearly constant, since pressure holding valve 28 operates as an absolute pressure valve. The ratio of areas between the effective area of pressure $p_{MF}$ and of pressure $p_R$ at disconnection valve 33 is chosen according to another aspect of the invention, so that at a break point the maximum $p_{MF}$ causes second pump flow 3 to be connected. If the pressure exceeds a switch-on threshold, then disconnection valve 33 is switched back to its closed position again, so that the flow volume of both pump flows 2, 3 is available.

It has also been found in connection with the present invention that a direct action of the pressure $p_{MF}$ on the disconnection valve could result in even a very low pressure $p_{MF}$ being sufficient to reconnect the second pump flow 3. It would be desirable, however, to reconnect second pump flow 3 only at higher pressures. At the same time, however, it is important to ensure that the second pump flow is reconnected in any case before the maximum possible pressure $p_{MF}$ is reached. By adding the second pump flow only when pressure becomes greater, it is possible to reduce the losses in particular when traveling at high velocity, that is, at high rotational speeds or high flow volumes.

For this purpose a connection valve 40 is provided, which is designed as a 3/2 directional valve. Connection valve 40 is biased toward its closed position by a spring 41, and is connected to the input of torque sensor 10 via a torque sensor pressure line 42, so that the pressure $p_{MF}$ prevails in torque sensor pressure line 42. In the closed position of connection valve 40 depicted in FIGS. 1 and 2, another control pressure line 38, which comes from disconnection valve 33, is connected through a tank line 43 to tank 5, so that the other control pressure line 38 is relieved into tank 5. A connection between the other control pressure line 38 and the torque sensor pressure line 42 is interrupted in the closed position by connection valve 40.

In its open position (not shown), connection valve 40 connects the torque sensor pressure line 42 to the other control pressure line 38, so that the pressure $p_{MF}$ ahead of the torque sensor acts on disconnection valve 33 through the torque sensor pressure line 42 and the other control pressure line 38. Connection valve 40 is pressurized against the biasing force of spring 41 with the pressure $p_{MF}$ through a torque sensor control pressure line 44. When the pressure $p_{MF}$ rises above a specified value, then connection valve 40 opens, so that disconnection valve 33 is closed, since the control pressure provided via the other control pressure line 38 works together with the biasing force of spring 36.

In the hydraulic system 1 depicted in FIG. 1 there can be a problem in that the actuating force for disconnection valve 33 through control pressure line 37 is rather small; that is, the pressure for a switching action is about 0.5 bar. A possible result of that is that an unwanted effect of flow forces at disconnection valve 33 can no longer be ignored.

As a remedial measure, in FIG. 2 a pressure conversion valve 60 is provided in control pressure line 37 in hydraulic system 51. Pressure conversion valve 60 can be pressurized at an elevated pressure through a setting pressure line 62. Pressure conversion valve 60 is actuated by the pressure in control pressure line 37 through a pressure return line 64. Pressure conversion valve 60 serves to elevate the pressure in return line 18 or in control pressure line 37, and thus to raise the actuating force at disconnection valve 33 significantly.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A hydraulic system for actuating a belt-driven conical-pulley transmission of a vehicle, the transmission having a torque sensor and providing a variably adjustable transmission ratio, said hydraulic system comprising: a hydraulic energy source operatively connected with the torque sensor for supplying a working medium; a torque sensor working medium inlet that is supplied with working medium by a first flow from the hydraulic energy source; a disconnection valve connected between the hydraulic energy source and a torque sensor working medium outlet for selectively connecting and disconnecting a second flow of working fluid from the hydraulic energy source to the torque sensor working medium inlet, depending on need; wherein the disconnection valve is connected via a first control pressure line to the torque sensor working medium outlet for providing a pressure for disconnecting the second flow from the hydraulic energy source and for connecting the second flow to a working medium reservoir; and including a pressure conversion valve connected into the first control pressure line.

2. The hydraulic system according to claim 1, characterized in that a check valve is connected between the first and second flows from the hydraulic energy source in such a way that the first flow is disconnected from the second flow as soon as the second flow is connected to the working medium reservoir by the disconnection valve.

3. The hydraulic system according to claim 1, wherein the disconnection valve is a 2/2 directional valve having an open position, and having a closed position into which the 2/2 directional valve is biased.

4. The hydraulic system according to claim 1, wherein the disconnection valve is connected via a second control pressure line to a connection valve that is connected ahead of the torque sensor.

5. The hydraulic system according to claim 4, wherein the connection valve is a 3/2 directional valve having an open position, and having a closed position into which the 3/2 directional valve is biased.

6. The hydraulic system according to claim 4, wherein the connection valve is actuated by a pressure ahead of the torque sensor.

7. The hydraulic system according to claim 4, wherein the disconnection valve is pressurizable toward a closed position by a pressure ahead of the torque sensor communicated via the second control pressure line and the connection valve.

8. The hydraulic system according to claim 1, wherein a pressure regulating valve is connected between the hydraulic energy source and the torque sensor.

* * * * *